United States Patent
Li

(10) Patent No.: US 7,250,742 B2
(45) Date of Patent: Jul. 31, 2007

(54) DIGITAL CONTROL OF BRIDGELESS POWER FACTOR CORRECTION CIRCUIT

(75) Inventor: Yong Li, Torrance, CA (US)

(73) Assignee: International Rectifier Corporation, El Segundo, CA (US)

(*) Notice: Subject to any disclaimer, the term of this patent is extended or adjusted under 35 U.S.C. 154(b) by 0 days.

(21) Appl. No.: 11/267,516

(22) Filed: Nov. 4, 2005

(65) Prior Publication Data

US 2006/0132104 A1    Jun. 22, 2006

Related U.S. Application Data

(60) Provisional application No. 60/626,117, filed on Nov. 8, 2004, provisional application No. 60/675,541, filed on Apr. 28, 2005.

(51) Int. Cl.
 *G05F 1/70* (2006.01)
(52) U.S. Cl. ........................... 323/207; 363/127
(58) Field of Classification Search ............... 323/207, 323/222; 363/127
 See application file for complete search history.

(56) References Cited

U.S. PATENT DOCUMENTS 6,215,287 B1   4/2001  Matsushiro et al. ........ 323/222
6,738,274 B2 *  5/2004  Prasad et al. .................. 363/70
7,088,081 B2    8/2006  Takahashi et al. .......... 323/222

OTHER PUBLICATIONS

International Search Report dated Oct. 10, 2006.

* cited by examiner

*Primary Examiner*—Shawn Riley
(74) *Attorney, Agent, or Firm*—Ostrolenk, Faber, Gerb & Soffen, LLP

(57) ABSTRACT

A circuit for providing power factor correction includes a bridgeless boost converter circuit and a control circuit receiving an input AC line voltage of the bridgeless boost converter circuit, wherein the control circuit provides a pulse width modulated signal to control the on time of a PFC switch of the bridgeless boost converter circuit. The control circuit also includes a scaling device operable to scale down a bi-polar AC voltage of the input AC line voltage to a uni-polar AC voltage, an analog to digital converter operable to convert the uni-polar AC voltage into digital data and a digital rectifier operable to process the digital data of the uni-polar AC voltage to provide a half-sinusoidal AC signal that is proportional to and in phase with the input AC line voltage for use in providing the pulse width modulated signal.

14 Claims, 5 Drawing Sheets

US 7,250,742 B2

DIGITAL CONTROL OF BRIDGELESS POWER FACTOR CORRECTION CIRCUIT

CROSS-REFERENCE TO RELATED APPLICATIONS

This application claims the benefit of and priority to Provisional Application Ser. No. 60/626,117 filed Nov. 8, 2004, entitled DIGITAL CONTROL OF BRIDGELESS POWER FACTOR CORRECTION CIRCUIT, the entire disclosure of which is hereby incorporated by reference herein. The present application further claims benefit of and priority to Provisional Application Ser. No. 60/675,541 filed Apr. 28, 2005 entitled DIGITAL IMPLEMENTATION OF PFC, the entire disclosure of which is also incorporated by reference herein.

This application is also related to Provisional Application Ser. No. 60/626,113 filed Nov. 8, 2004 entitled PWM BLANKING ALGORITHM IN HIGH-FREQUENCY PARTIAL PFC, Provisional Application Ser. No. 60/626,112 filed Nov. 8, 2004 entitled DC BUS VOLTAGE CONTROL METHOD IN HIGH-FREQUENCY PARTIAL PFC and U.S. Patent application Ser. No. 11/165,939 filed Jun. 24, 2005 entitled HIGH FREQUENCY BOOST POWER FACTOR CORRECTION CONTROL CIRCUIT AND METHOD which claims the benefit of and-priority to Provisional Application Ser. No. 60/583,752 filed Jun. 28, 2004 entitled A NEW HIGH-FREQUENCY PARTIAL BOOST POWER-FACTOR-CORRECTION CONTROL METHOD, the entire disclosures of which are incorporated by reference herein.

BACKGROUND OF THE INVENTION

The present invention relates to power factor correction circuits, that is, circuits for reducing the distortion and harmonics generated in a power line feeding a power supply, and in particular a switched mode power supply to make the circuit, including the attached load, appear to be a substantially resistive load. More specifically, the present application relates to a control circuit for use in digital control of a bridgeless power factor correction (PFC) circuit. The aim of power factor correction circuits is to ensure that the AC voltage and current are substantially in phase which improves efficiency and at the same time eliminates the generation of harmful harmonics.

In a conventional boost power factor correction circuit such as that illustrated in FIG. 1, it is common to use a rectifying bridge as illustrated. The rectified AC is provided to the boost inductor L1. A PFC switch Q1 is coupled in series with the inductor and across the output of the bridge rectifier after the inductor. The boost diode BD is coupled in series with the inductor L1 and the output capacitor COUT is coupled as shown at the output of the boost converter circuit in known fashion. The voltage across the capacitor COUT comprises the DC bus voltage which is provided to a load which might comprise, for example a DC to AC inverter driving a three phase motor load ML, for example.

The boost converter circuit is typically controlled via a control circuit in the manner illustrated in FIG. 2. The output of the DC bus Vdc is provided to an A to D converter 10 which has as inputs the DC bus voltage Vdc, the current $I_{IN}$ in the inductor L1 as sensed by a resistor R1 or by other sensing means, as well as the rectified AC input voltage $V_{IN}$. The A to D converter produces three outputs comprising digital implementations of the DC bus voltage, VdcFdb, the input voltage V_IN and the inductor current I_IN.

A ramp generator 20 receives a DC target voltage VdcTgt. The output of the ramp generator is provided to a difference circuit 22 in which the DC bus voltage is subtracted from the ramp voltage. This is fed to a voltage regulator which may comprise a PI controller 24. The output of the PI controller 24 is fed to a multiplier circuit 26 wherein the voltage output from the voltage regulator (PI controller) and the input voltage V_IN are multiplied. This results in a reference PFC signal IREF_PFC 28, from which the inductor current is subtracted in a difference stage 30. The output of this difference stage 30 is fed to a current regulator 32 comprising a PI controller. The output of the controller 32 is fed to a comparator 34 wherein the PWM signal is generated by comparing an oscillator signal typically a ramp or sawtooth signal 36 generated by an oscillator with the output of the controller 32. This controls the duty cycle of the PWM signal provided to control the switch Q1 and thereby control the power factor correction.

The traditional boost power factor correction circuit, utilizing the bridge rectifier, however, has some drawbacks and thus it is often advantageous to utilized a bridgeless power factor correction circuit such as that illustrated in FIG. 3, for example. It is noted that in the bridgeless PFC only two devices are in series in each current flowing path, thus reducing total forward voltage drop, conduction losses and improving efficiency of the circuit. In addition, since two IGBT's Q1, Q2 are utilized, the thermal stress on each is reduced by 50%. These features have lead to an increased use of bridgeless PFC circuits in motor drive applications, such as air conditioners for example.

The control of bridgeless PFC circuits, however, has not developed quickly. In fact, the utilization of digital control circuits for controlling bridgeless PFC circuits has been unknown until now. One of the challenges to the control of the bridgeless PFC circuits is how to sense the input AC line voltage to provide a sinusoidal reference to shape the PCF current. The PFC control circuit needs a rectified half-sinusoidal AC voltage signal which refers to the negative DC bus voltage as ground. In the conventional PFC circuit, the rectified half sinusoidal AC voltage is available as a result of the use of the bridge rectifier. Naturally, this half sinusoidal AC voltage is not available in the absence of the bridge rectifier.

While some solutions have been proposed to solve this problem, such as the use of an additional isolation transformer and an additional diode bridge rectifier, or the use of an opto-coupler and an additional processing circuit to obtain a zero crossing point of the input AC line voltage, these solutions add significantly to cost and the complexity of the circuit.

An aim of the present invention is to provide a digital control circuit for use with a bridgeless PFC circuits that avoids the problems noted above.

SUMMARY OF THE INVENTION

The invention provides an alternative PFC circuit and method that uses a differential operational amplifier with offset voltage to scale down the bi-polar AC input voltage of the PFC to uni-polar AC voltage, with the uni-polar AC voltage digitized and then processed in the digital domain to remove the offset provided by the operation amplifiers and to provide absolute values of the digital data in order to provide a half-sinusoidal AC signal that is proportional to and in phase with the input AC line voltage.

A circuit for providing power factor correction includes a bridgeless boost converter circuit and a control circuit receiving an input AC line voltage of the bridgeless boost converter circuit, wherein the control circuit provides a pulse width modulated signal to control the on time of a PFC switch of the bridgeless boost converter circuit The control circuit includes a scaling device operable to scale down a bi-polar AC voltage of the input AC line voltage to a uni-polar AC voltage, an analog to digital converter operable to convert the uni-polar AC voltage into digital data and a digital rectifier operable to process the digital data of the uni-polar AC voltage to provide a half-sinusoidal AC signal that is proportional to and in phase with the input AC line voltage for use in providing the pulse width modulated signal.

A method for providing power factor correction in a bridgeless boost converter circuit includes receiving an input AC line voltage of the bridgeless boost converter circuit, scaling a bipolar AC voltage of the input AC line voltage down to provide a uni-polar AC voltage, converting the uni-polar AC voltage into digital data, processing the digital data of the uni-polar AC voltage to provide a half sinusoidal AC voltage signal that is proportional to and in phase with the input AC line voltage and generating a pulse width modulated signal to control an on time of a PFC switch of the bridgeless boost converter circuit, wherein the sinusoidal AC voltage signal is used to generate the pulse width modulated signal.

A control circuit for use with a bridgeless boost converter circuit to provide power factor correction includes an input operable to receive an input AC line voltage of the bridgeless boost converter circuit, a scaling device operable to scale down a bi-polar AC voltage received from the input AC line to a uni-polar AC voltage signal, an analog to digital converter operable to convert the uni-polar AC voltage into digital data, a digital rectifier operable to process the digital data of the uni-polar AC voltage to provide a half-sinusoidal AC signal that is proportional to and in phase with the input AC line voltage and a pulse width modulated signal generator operable to provide a pulse width modulated signal to control an on time of a PFC switch of the bridgeless boost converter circuit, wherein the half sinusoidal AC signal provided by the digital rectifier is used to provide the pulse width modulated signal.

BRIEF DESCRIPTION OF THE DRAWING(S)

The invention will be now be described in greater detail in the following detailed description with reference to the drawings in which FIG. 1 shows a conventional boost converter circuit;

Other objects, features and advantages of the present invention will be apparent from the following detailed description.

DETAILED DESCRIPTION OF PREFERRED EMBODIMENTS OF THE INVENTION

Figure 1:
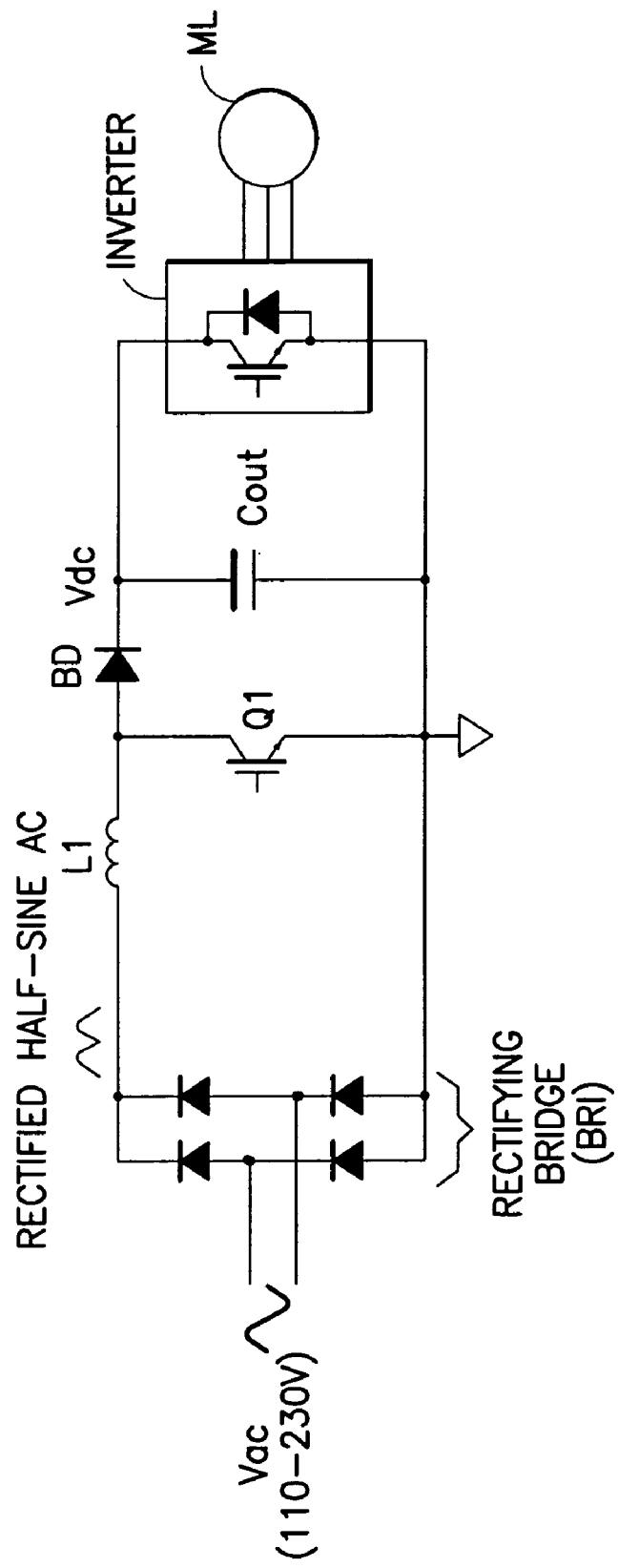
Figure 2:
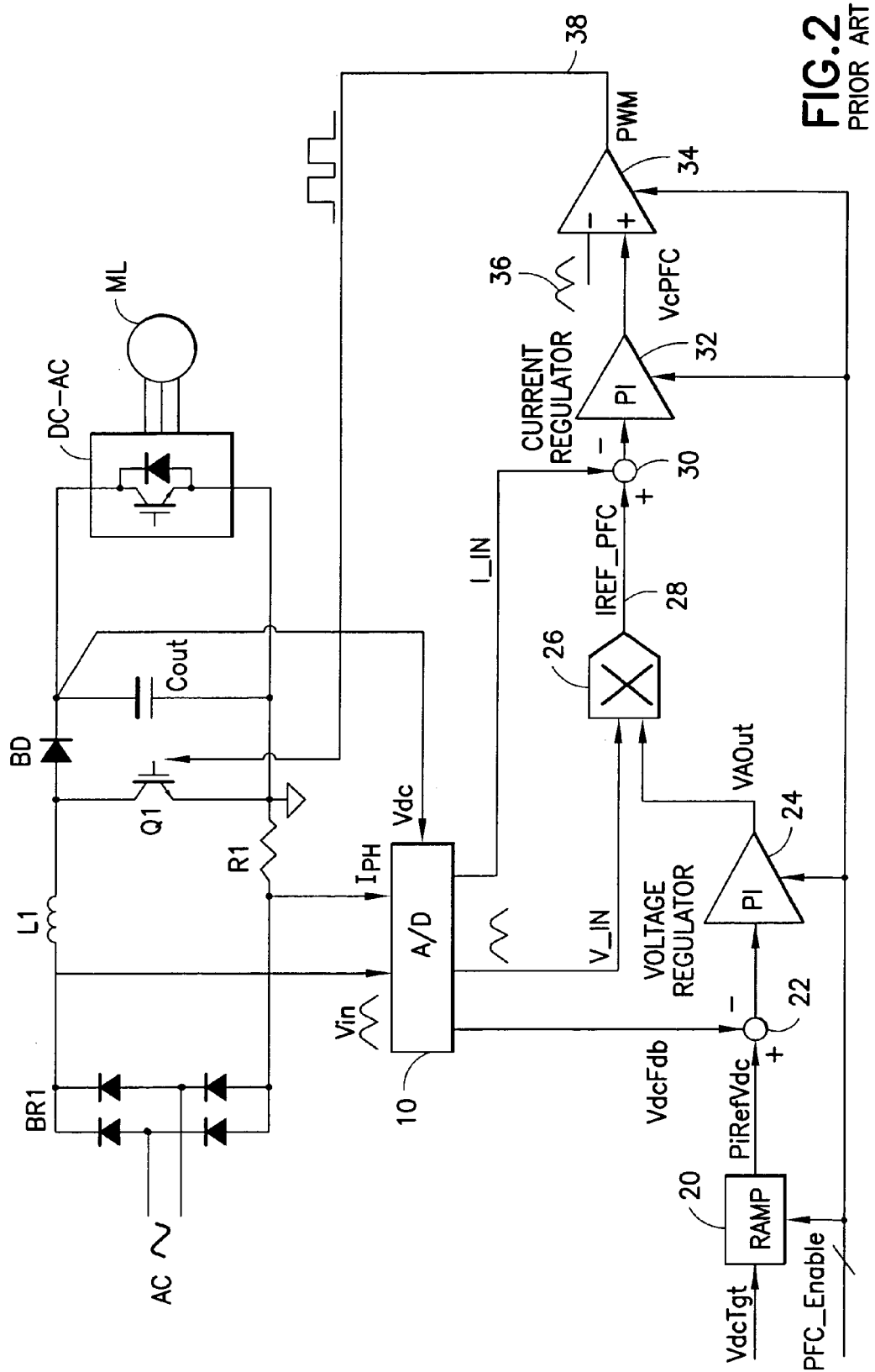
FIG. 2 shows a control circuit in conjunction with the boost converter circuit of FIG. 1.
Figure 3:
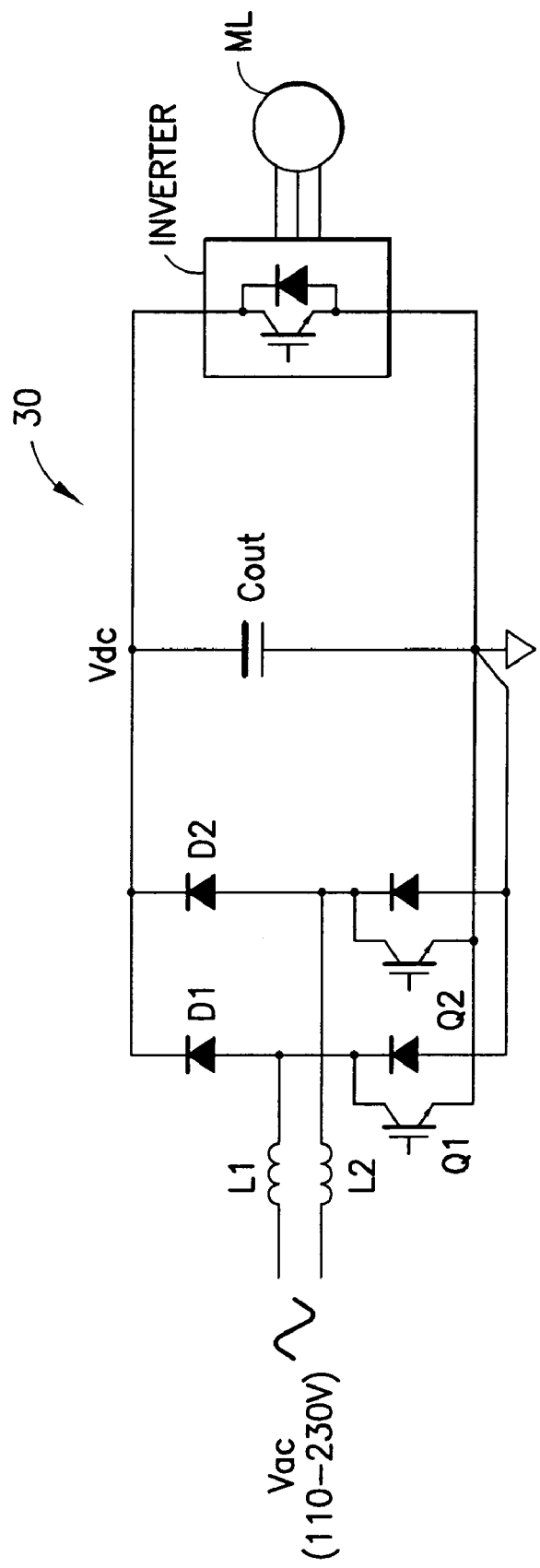
FIG. 3 shows a bridgeless boost converter circuit.

With reference to the drawings, FIG. 3 illustrates a bridgeless boost converter circuit 30. The bridgeless boost converter circuit 30 is includes inductors L1 and L2 is series with each lead of the input AC line. The implementation of inductors L1 and L2 can be in two split inductors wound in two separate cores, as shown in FIG. 3, or can be two split inductors but wound in one common core and coupled to each other or combined into one single inductor. The operation of the inductors is substantially the same regardless of which implementation is used and the control circuit and method of the present application would be equally applicable for use with any implementation. Diodes D1 and D2 are placed in series with the inductors L1 and L2, respectively. Switches Q1 and Q1, which are preferably IGBT transistors are placed in conjunction with the diodes Dl and D2 respectively. The diodes D1 and D2 act as boost diodes and the output capacitor COUT is coupled as shown at the output of the bridgeless boost converter circuit in a known fashion. The voltage across the capacitor GOUT comprises the DC bus voltage which is provided to a load which might comprise, for example a DC to AC inverter driving a three phase motor load ML.

Figure 4:
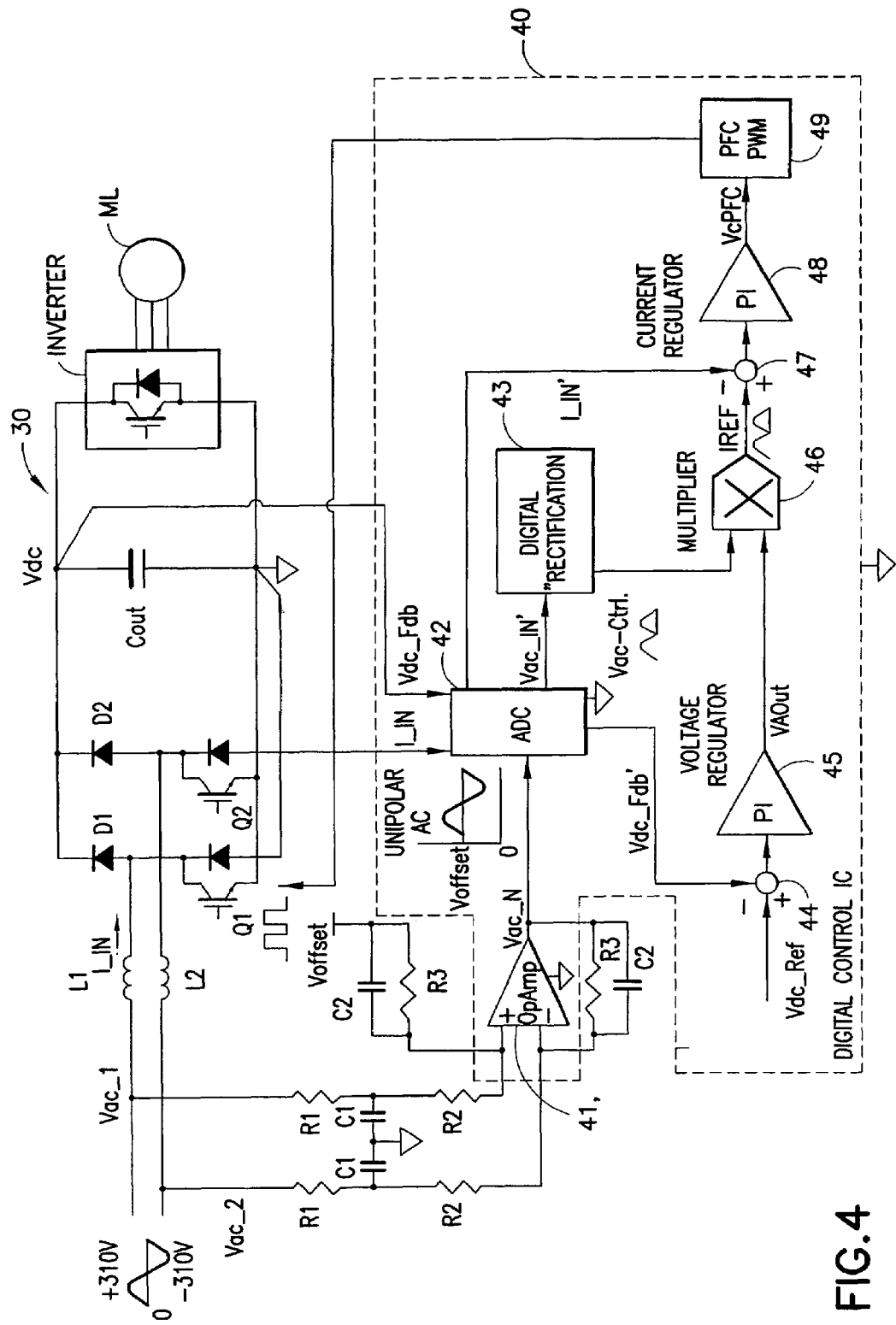
FIG. 4 illustrates a bridgeless boost converter circuit with a digital control circuit in accordance with a preferred embodiment of the present invention.

FIG. 4 illustrates a power factor correction circuit in accordance with a preferred embodiment of the present invention. The circuit includes bridgeless boost converter circuit 30 and a digital control circuit 40 which may be used to control the bridgeless boost converter circuit 30. Converter circuit 30 is substantially the same as that described above with respect to FIG. 3.

The input AC line voltage, comprising Vac_1 and Vac_2, of the bridgeless booster converter circuit 30 is provided to a differential operational amplifier 41 of the digital control circuit 40 via resistors R1 and R2. The gain of the operational amplifier 41 is provided by the following equation:

$$Vac\_IN=[R3/R1+R2]*(Vac\_1-Vac\_2)+Voffset$$

where Voffset is half of the maximum analog-to-digital (ADC) input voltage, and for example, it is approximately 0.6 V when the analog-to-digital converter (ADC) 42 utilized by the control circuit has an input range of 0-1.2V. The capacitors C1, i.e. the ones across the operational amplifier, reduce high frequency common mode grounding noise. The capacitors C2 reduce differential mode noise. The operational amplifier 41 scales the bi-polar input AC line voltage, which may have a peak of up to 380 V, down to provide a uni-polar AC voltage Vac_IN which preferably has an amplitude compatible with the ADC 42, such as 1.2 V. The uni-polar AC voltage of the operational amplifier Vac_IN is then provided to the ADC 42 where a digital implementation of Vac_IN signal, Vac_IN$^{1'}$ is provided. While in the preferred embodiment, a differential operational amplifier with voltage offset is used to scale down the input AC line voltage, any scaling device that receives the bi-polar AC voltage of the input AC line voltage and provides a scaled down uni-polar AC voltage signal may be used.

The digital data related to the uni-polar AC voltage Vac_IN$^1$ from the ADC 42 is provided to a digital rectifier 43. The digital rectifier 43 removes the offset voltage provided by the operational amplifier 41 and provides absolute values for the digital data related to the unipolar AC voltage, $V_{ac\_IN}^1$, to provide a half sinusoid AC signal, Vac_Ctrl that is proportional to and in phase with the input AC line voltage.

As noted above, the uni-polar AC voltage signal Vac_IN is provided to the ADC 42. In addition, the output of the DC bus $V_{dc}$ is also provided to the ADC 42 along with the current I_IN as sensed by a resistor R1, or by other sensing means. The ADC 42 produces three outputs comprising digital representations of: the DC bus voltage, VdcFdb (VdcFdb$^1$), the unipolar AC voltage, Vac_IN (Vac_IN$^1$) and the current I_IN (I_IN$^1$).

The digital representation of the DC reference voltage (VdcFdb$^1$) is provided to a difference circuit 44 in which the digital implementation of the DC bus voltage (VdcFdb$^1$) is subtracted from a DC reference voltage Vdc_Ref. This result is fed to a voltage regulator, which may comprise a PI controller 45. The output, VAOut, of the PI controller 45 is fed to a multiplier circuit 46 wherein it is multiplied with the half sinusoidal AC signal Vac_Ctrl. This results in a reference PFC signal I_Ref, from which the current I_IN is subtracted in a difference stage 47. The output of this difference stage 47 is fed to a current regulator 48 comprising a PI controller. The output of the controller 48, VcPFC is fed to a PFC Pulse Width Modulation generator (PFCPWM) 49 wherein the PWM signal is generated to control the duty cycle of the PWM signal provided to control the switches Q1 and Q2 and thereby control the power factor correction.

As can be seen by the above description, the control circuit operates in substantially the same manner as it would with a booster converter circuit with a rectifier bridge except for the scaling of the input AC line voltage and the processing of the digital data related to the scaled signal to remove the effects of the scaling and to provide the half sinusoidal AC signal. Once generated, the half sinusoidal signal is treated in much the same manner as the rectified voltage is when utilizing a booster converter circuit with a rectifier bridge.

Figure 5:
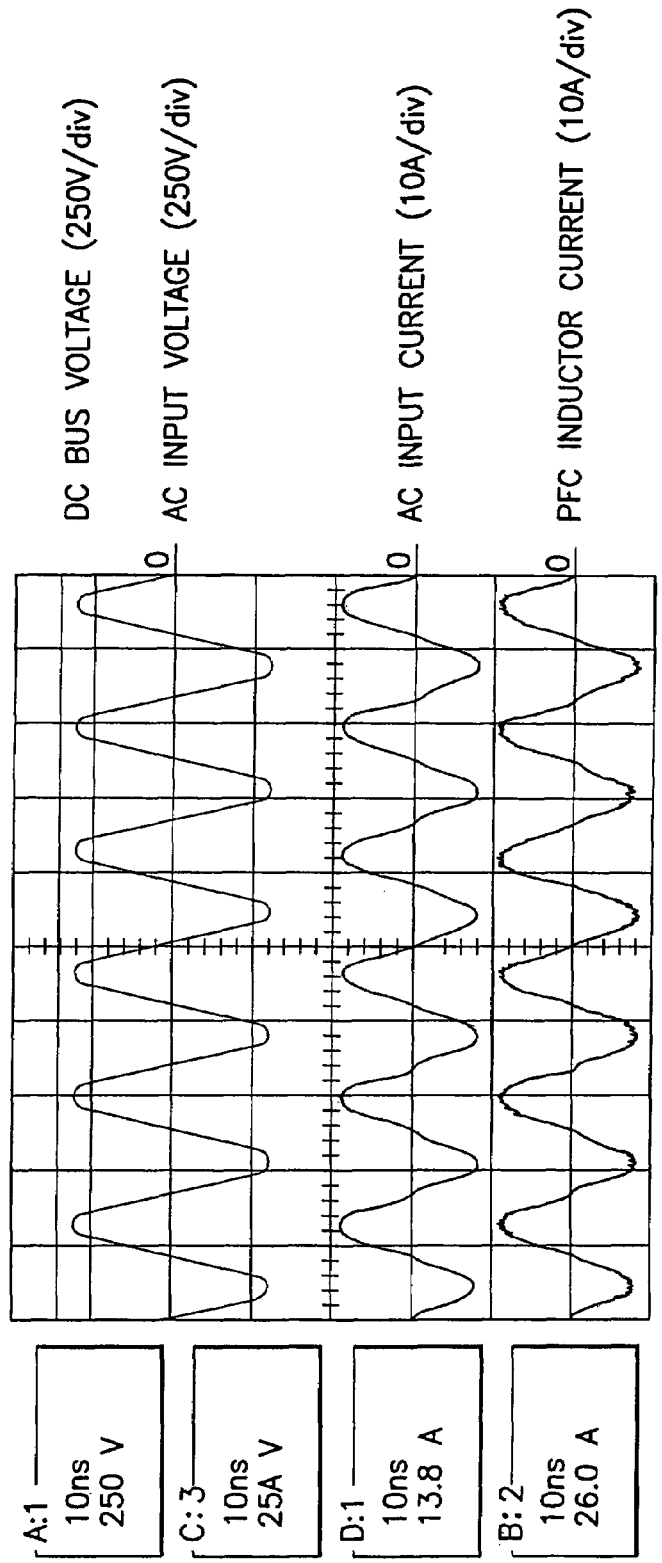
FIG. 5 shows waveforms in the circuit of FIG. 4.

FIG. 5 shows signals in the circuit of FIG. 4 including the DC bus voltage, the AC input voltage and the AC input current and the PFC Inductor current illustrating that the circuit of FIG. 4 provides effective control of power-factor correction.

It is noted that the circuits of FIG. 3 or FIG. 4 may be implemented in integrated circuit form in a single package if desired.

Although the present invention has been described in relation to particular embodiments thereof, many other variations and modifications and other uses will become apparent to those skilled in the art. Therefore the present invention should be limited not by the specific disclosure herein, but only by the appended claims.

What is claimed is:

1. A circuit for providing power factor correction comprising:
    a bridgeless boost converter circuit;
    an input circuit for an AC line voltage;
    a control circuit receiving the AC line voltage, the control circuit being operative to provide a pulse width modulated signal to control the on time of a PFC switch of the bridgeless boost converter circuit;
    the control circuit comprising:
    a scaling device operable to scale down an AC line voltage from bipolar to uni-polar form;
    an analog to digital converter operable to convert the uni-polar AC voltage into digital data;
    a digital rectifier operable to process the digital data of the uni-polar AC voltage to provide a half-sinusoidal AC signal that is proportional to and in phase with the input AC line voltage; and
    a pulse width modulation circuit responsive to the half sinusoidal AC signal to control an on time of a PFC switch of the bridgeless boost converted circuit.

2. The circuit of claim 1, wherein the scaling device comprises a differential operational amplifier with offset voltage.

3. The circuit of claim 2, wherein the digital rectifier is operative to remove the offset voltage resulting from the differential operational amplifier from the digital data of the uni-polar AC voltage and to provide absolute values of the digital data to produce the half-sinusoidal AC signal.

4. The circuit of claim 1, wherein the uni-polar AC voltage has a magnitude compatible with the analog to digital converter.

5. The circuit of claim 1, wherein the circuit is implemented in integrated circuit form in a single package.

6. A method for providing power factor correction in a bridgeless boost converter circuit, driven by an input AC line voltage, the method comprising:
    receiving the input AC line voltage of the bridgeless boost converter circuit;
    scaling the AC line voltage of the input AC line voltage down from bipolar to uni-polar form;
    converting the uni-polar AC voltage into digital data;
    processing the digital data of the uni-polar AC voltage to provide a half sinusoidal AC voltage signal that is proportional to and in phase with the input AC line voltage; and
    generating a pulse width modulated signal to control an on time of a PFC switch of the bridgeless boost converter circuit from the half sinusoidal AC voltage signal.

7. The method of claim 6, wherein the scaling step further comprises providing the input AC line voltage to a differential operational amplifier with voltage offset to provide the uni-polar AC voltage signal.

8. The method of claim 7, wherein the processing step further comprises:
    removing digital data representing the offset voltage from the digital data of the uni-polar AC voltage signal; and
    providing absolute values for the digital data to provide the half sinusoidal AC voltage signal.

9. The method of claim 6, wherein the uni-polar AC voltage has a magnitude suitable for analog to digital conversion.

10. A control circuit for a bridgeless boost converter circuit to provide power factor correction comprising:
    an input operable to receive an input AC line voltage of a bridgeless boost converter circuit;
    a scaling device operable to scale down the AC line voltage from bipolar to uni-polar form;
    an analog to digital converter operable to convert the uni-polar AC voltage into digital data;
    a digital rectifier operable to process the digital data of the uni-polar AC voltage to provide a half-sinusoidal AC signal that is proportional to and in phase with the input AC line voltage; and
    a pulse width modulated signal generator responsive to the half-sinusoidal AC signal to control an on time of a PFC switch of the bridgeless boost converter circuit, wherein the half sinusoidal AC signal provided by the digital rectifier is used to provide the pulse width modulated signal.

11. The control circuit of claim 10, wherein the scaling device comprises a differential operational amplifier with offset voltage.

12. The control circuit of claim 11, wherein the digital rectifier is operative to remove the offset voltage resulting from the differential operational amplifier from the digital data of the uni-polar AC voltage and to provide absolute values of the digital data to produce the half-sinusoidal AC signal.

13. The control circuit of claim 10, wherein the uni-polar AC voltage has a magnitude compatible with the analog to digital converter.

14. The control circuit of claim 10, wherein the control circuit is implemented in integrated circuit form in a single package.

* * * * *